(12) United States Patent
Shen et al.

(10) Patent No.: US 10,066,933 B2
(45) Date of Patent: Sep. 4, 2018

(54) CAMERA DEPTH MAPPING USING STRUCTURED LIGHT PATTERNS

(71) Applicant: Facebook, Inc., Menlo Park, CA (US)

(72) Inventors: Shizhe Shen, San Mateo, CA (US); Francislav P. Penov, Kirkland, WA (US); Aidymar Bigio, Hillsborough, CA (US)

(73) Assignee: FACEBOOK, INC., Menlo Park, CA (US)

(*) Notice: Subject to any disclaimer, the term of this patent is extended or adjusted under 35 U.S.C. 154(b) by 427 days.

(21) Appl. No.: 14/703,649

(22) Filed: May 4, 2015

(65) Prior Publication Data

US 2016/0330433 A1   Nov. 10, 2016

(51) Int. Cl.
| | |
|---|---|
| *H04N 5/228* | (2006.01) |
| *H04N 5/222* | (2006.01) |
| *G01B 11/25* | (2006.01) |
| *G01S 1/00* | (2006.01) |
| *G06T 7/00* | (2017.01) |
| *G01S 17/46* | (2006.01) |
| *G01S 17/89* | (2006.01) |

(52) U.S. Cl.
CPC .......... *G01B 11/2513* (2013.01); *G01S 1/00* (2013.01); *G01S 17/46* (2013.01); *G01S 17/89* (2013.01); *G06T 7/00* (2013.01)

(58) Field of Classification Search
CPC .. H04N 5/2354; H04N 5/2256; H04N 5/2351; H04N 9/735; G03B 15/05; G01S 17/89; G01N 21/8806
See application file for complete search history.

(56) References Cited

U.S. PATENT DOCUMENTS

| | | | | |
|---|---|---|---|---|
| 2012/0249743 | A1* | 10/2012 | Kim | H04N 5/23293 348/46 |
| 2012/0327218 | A1* | 12/2012 | Baker | H04N 5/23212 348/135 |
| 2015/0030256 | A1* | 1/2015 | Brady | H01Q 3/24 382/254 |
| 2015/0187082 | A1* | 7/2015 | Bernal | G06T 7/0075 382/154 |
| 2016/0309068 | A1* | 10/2016 | Nadeau | G01J 3/2846 |

* cited by examiner

*Primary Examiner* — Sinh Tran
*Assistant Examiner* — Selam Gebriel
(74) *Attorney, Agent, or Firm* — Morgan, Lewis & Bockius LLP (57) ABSTRACT

The various embodiments described herein include methods and/or systems for depth mapping. In one aspect, a method of depth mapping is performed at an apparatus including a projector, a camera, one or more processors, and memory storing one or more programs for execution by the one or more processors. The method includes identifying one or more areas of interest in a scene in accordance with variation of depth in the scene as detected at a first resolution. The method also includes, for each area of interest: (1) applying, via the projector, a respective structured-light pattern to the area of interest; (2) capturing, via the camera, an image of the area of interest with the respective structured-light pattern applied to it; and (3) creating a respective depth map of the area of interest using the captured image, the respective depth map having a higher resolution than the first resolution.

19 Claims, 12 Drawing Sheets

CAMERA DEPTH MAPPING USING STRUCTURED LIGHT PATTERNS

TECHNICAL FIELD

The disclosed embodiments relate generally to depth mapping techniques, including but not limited to camera depth mapping.

BACKGROUND

Depth mapping refers to gathering information relating to the distance of objects in a scene from a viewpoint. Depth mapping enables users and applications to accomplish, or improve upon, various tasks such as object recognition, gesture control, and focus control.

However, there is an ongoing challenge to efficiently generate accurate and precise depth maps. Conventional methods for depth mapping are imprecise and/or inefficient (e.g., require excessive power consumption, processing, and/or expense).

SUMMARY

Accordingly, there is a need for apparatuses and/or devices with more precise and/or efficient methods for depth mapping. Such methods and apparatuses optionally complement or replace conventional depth mapping methods and apparatuses.

In one aspect, some embodiments include a method performed at an apparatus includes a projector, a camera, one or more processors, and memory storing one or more programs for execution by the one or more processors. The method includes identifying one or more areas of interest in a scene in accordance with variation of depth in the scene as detected at a first resolution. The method further includes, for each area of interest of the one or more areas of interest: (1) applying, via the projector, a respective structured-light pattern to the area of interest; (2) capturing, via the camera, an image of the area of interest with the respective structured-light pattern applied to it; and (3) creating a respective depth map of the area of interest using the image of the area of interest with the respective structured-light pattern applied to it, the respective depth map having a higher resolution than the first resolution.

In another aspect, some embodiments include an apparatus (e.g., a mobile device) with one or more processors and memory storing one or more programs. The one or more programs are configured to be executed by the one or more processors. The one or more programs include instructions for performing the method described above.

In yet another aspect, some embodiments include a non-transitory computer-readable storage medium that has stored therein instructions that, when executed by an apparatus, cause the apparatus to perform the operations of the method described above. In still another aspect, some embodiments include an apparatus with one or more processors, memory storing one or more programs configured to be executed by the one or more processors, and means for performing the method described above.

Thus, apparatuses are provided with more precise/efficient methods for depth mapping, thereby increasing the accuracy and user satisfaction with such apparatuses. Such methods may complement or replace conventional methods for depth mapping.

BRIEF DESCRIPTION OF THE DRAWINGS

For a better understanding of the various described embodiments, reference should be made to the Description of Embodiments below, in conjunction with the following drawings. The appended drawings, however, merely illustrate the more pertinent features of the present disclosure and are therefore not to be considered limiting, for the description may admit to other effective features. Like reference numerals refer to corresponding parts throughout the figures and description.

In accordance with common practice the various features illustrated in the drawings may not be drawn to scale. Accordingly, the dimensions of the various features may be arbitrarily expanded or reduced for clarity. In addition, some of the drawings may not depict all of the components of an apparatus, device, or medium.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In some instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first area of interest could be termed a second area of interest, and, similarly, a second area of interest could be termed a first area of interest, without departing from the scope of the various described embodiments. The first area of interest and the second area of interest are both areas of interest, but they are not the same area of interest.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context. In addition, the term "exemplary" is used in the sense of "serving as an example, instance, or illustration" and not in the sense of "representing the best of its kind."

Embodiments of apparatuses and associated processes for using such apparatuses are described. In some embodiments, the apparatus is a portable electronic device (e.g., communications device), such as a mobile telephone or personal digital assistant (PDA), that also contains other functions, such as camera functions. Other portable electronic devices, such as laptops or tablet computers are optionally used. It should also be understood that, in some embodiments, the apparatus is not a portable communications device, but is another type of device, such as a desktop computer, or an apparatus including a network of components.

Figure 1:
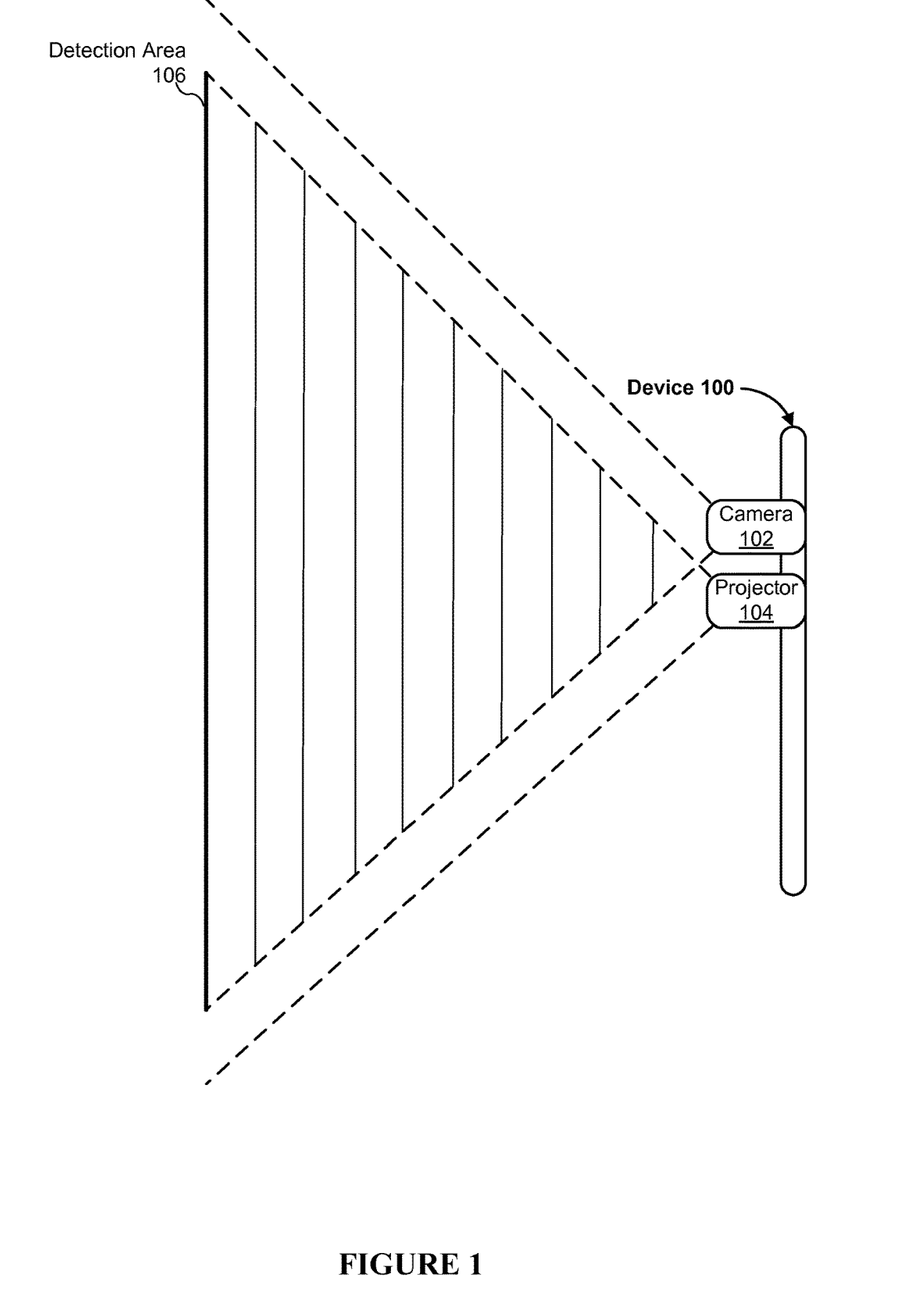
FIG. 1 is a diagram illustrating an exemplary implementation of a depth mapping device, in accordance with some embodiments.

FIG. 1 is a diagram illustrating an exemplary implementation of depth mapping device 100 (sometimes called "device 100"), in accordance with some embodiments. Device 100 includes camera 102 and projector 104. FIG. 1 also shows detection area 106 for device 100. Detection area 106 is the area in which the field of view of camera 102 and the field of projection of projector 104 overlap. In some instances, the horizontal range of detection area 106 is limited by the range of projector 104. In some instances, the horizontal range of detection area 106 is limited by the light-capturing capabilities of camera 102. Device 100 optionally includes one or more additional components such as a display, a user interface, and a flash. In some embodiments, device 100 is a mobile device such as a mobile telephone or a tablet computer. In some embodiments, device 100 is a stationary device such as a desktop computer or a computer system.

Camera 102 (also sometimes called an "optical sensor") captures light from the environment, projected through one or more lens, and converts the light to data representing an image. In conjunction with an imaging module (e.g., imaging module 234, FIG. 2), camera 102 captures still images and/or video. Camera 102 optionally includes charge-coupled device (CCD) or complementary metal-oxide semiconductor (CMOS) phototransistors. In some embodiments, camera 102 is capable of capturing infrared light and/or near infrared light. In some embodiments, camera 102 is capable of capturing visible and infrared light.

In conjunction with a projection module (e.g., projection module 230, FIG. 2), projector 104 projects light (e.g., structured light). In some embodiments, projector 104 is a pico projector (also sometimes called a "pocket projector", "mobile projector", or "mini beamer"). In some embodiments, projector 104 is capable of projecting infrared light and/or near infrared light. In some embodiments, projector 104 includes one or more lasers. In some embodiments, projector 104 includes one or more light-emitting diodes (LEDs). In some embodiments, projector 104 includes one or more organic light-emitting diodes (OLEDs). In some embodiments, projector 104 includes one or more liquid-crystal-on-silicon (LCoS) devices.

Figure 2:
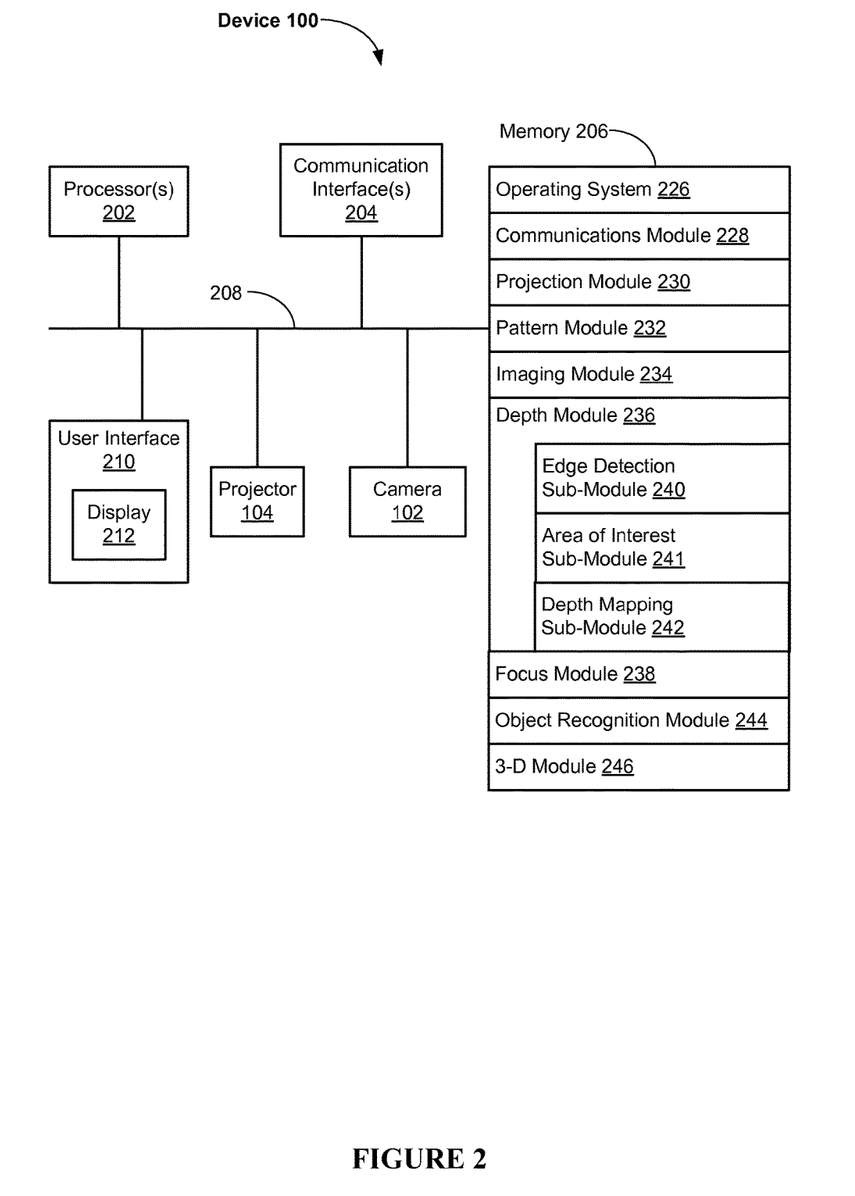
FIG. 2 is a block diagram illustrating an exemplary implementation of the depth mapping device, in accordance with some embodiments.

FIG. 2 is a block diagram illustrating an exemplary implementation of device 100, in accordance with some embodiments. Device 100, in the example of FIG. 2, includes one or more processing units (processors or cores) 202, one or more network or other communications interfaces 204, memory 206, and one or more communication buses 208 for interconnecting these components. Communication buses 208 optionally include circuitry (sometimes called a chipset) that interconnects and controls communications between system components. Device 100 also includes a user interface 210. User interface 210 includes display 212. Device 100 further includes camera 102 and projector 104. In some embodiments, projector 104 is separate from device 100. In some embodiments, projector 104 and camera 102 are distinct devices within a single apparatus. The user interface 210, projector 104, and camera 102 thus may also connect to the one or more communication buses 208.

In some embodiments, the device includes inputs such as a keyboard, mouse, and/or other input buttons. Alternatively, or in addition, in some embodiments, display 212 includes a touch-sensitive surface, in which case display 212 is a touch-sensitive display. In devices that have a touch-sensitive display, a physical keyboard is optional (e.g., a soft keyboard may be displayed when keyboard entry is needed). User interface 210 optionally also includes an audio output device, such as speakers or an audio output connection connected to speakers, earphones, or headphones. Furthermore, some devices 100 use a microphone and voice recognition to supplement or replace the keyboard. Optionally, device 100 includes an audio input device (e.g., a microphone) to capture audio (e.g., speech from a user). Optionally, device 100 includes a location detection component, such as a GPS (global positioning satellite) or other geo-location receiver, for determining the location of device 100.

Memory 206 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 206 optionally includes one or more storage devices remotely located from processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules, and data structures, or a subset or superset thereof:

- operating system 226 that includes procedures for handling various basic system services and for performing hardware dependent tasks;
- network communication module 228 for connecting device 100 to other devices via communication network interface(s) 204 (wired or wireless) and one or more communication networks, such as the Internet, cellular telephone networks, mobile data networks, other wide area networks, local area networks, metropolitan area networks, and so on;
- projection module 230 for projecting light (e.g., structured light) in conjunction with projector 104;

pattern module 232 for obtaining (e.g., receiving or generating) structured-light patterns for use with projector 104;

imaging module 234 for capturing still and/or video images of a scene in conjunction with camera 102;

depth module 236 for generating and analyzing depth maps, including the following sub-modules, or a subset or superset thereof:

edge detection sub-module 240 for detecting depth disrupting edges (e.g., object edges) in the scene;

area of interest sub-module 241 for identifying areas of interest in the scene; and depth mapping sub-module 242 for generating depth maps of the scene or portions thereof;

focus module 238 for focusing camera 102;

object recognition module 244 for identifying objects in a scene; and

3-D module 246 for recognizing 3-D gestures that utilize device 100.

Each of the above identified modules and applications correspond to a set of executable instructions for performing one or more functions as described above and/or in the methods described herein (e.g., the computer-implemented methods and other information processing methods described herein). These modules (i.e., sets of instructions) need not be implemented as separate software programs, procedures, or modules, and thus various subsets of these modules are, optionally, combined or otherwise re-arranged in various embodiments. In some embodiments, memory 206 stores a subset of the modules and data structures identified above. Furthermore, memory 206 optionally stores additional modules and data structures not described above.

In some embodiments, memory 206 also includes one or more application modules. Examples of application modules that are, optionally, stored in memory 206 include word processing applications, image editing applications, drawing applications, presentation applications, browser applications, JAVA-enabled applications, encryption, digital rights management, voice recognition, and voice replication.

Although FIG. 2 shows an example of depth mapping device 100, FIG. 2 is intended more as a functional description of the various features which may be present in a depth mapping device than as a structural schematic of the embodiments described herein. In practice, and as recognized by those of ordinary skill in the art, items shown separately could be combined and some items could be separated.

Figure 3A:
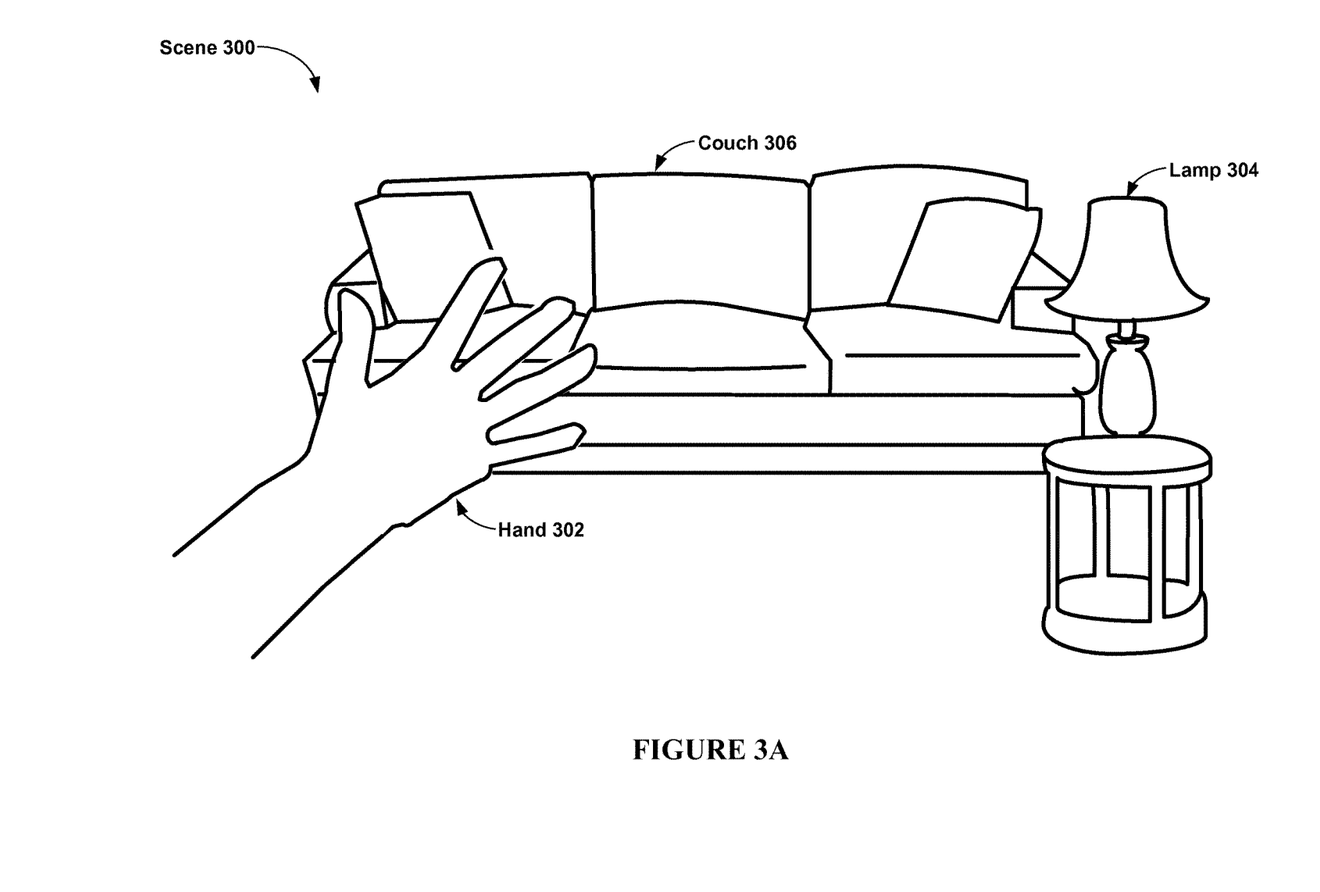
FIGS. 3A-3B illustrate exemplary procedures for projecting structured light on a scene, in accordance with some embodiments.
Figure 3B:
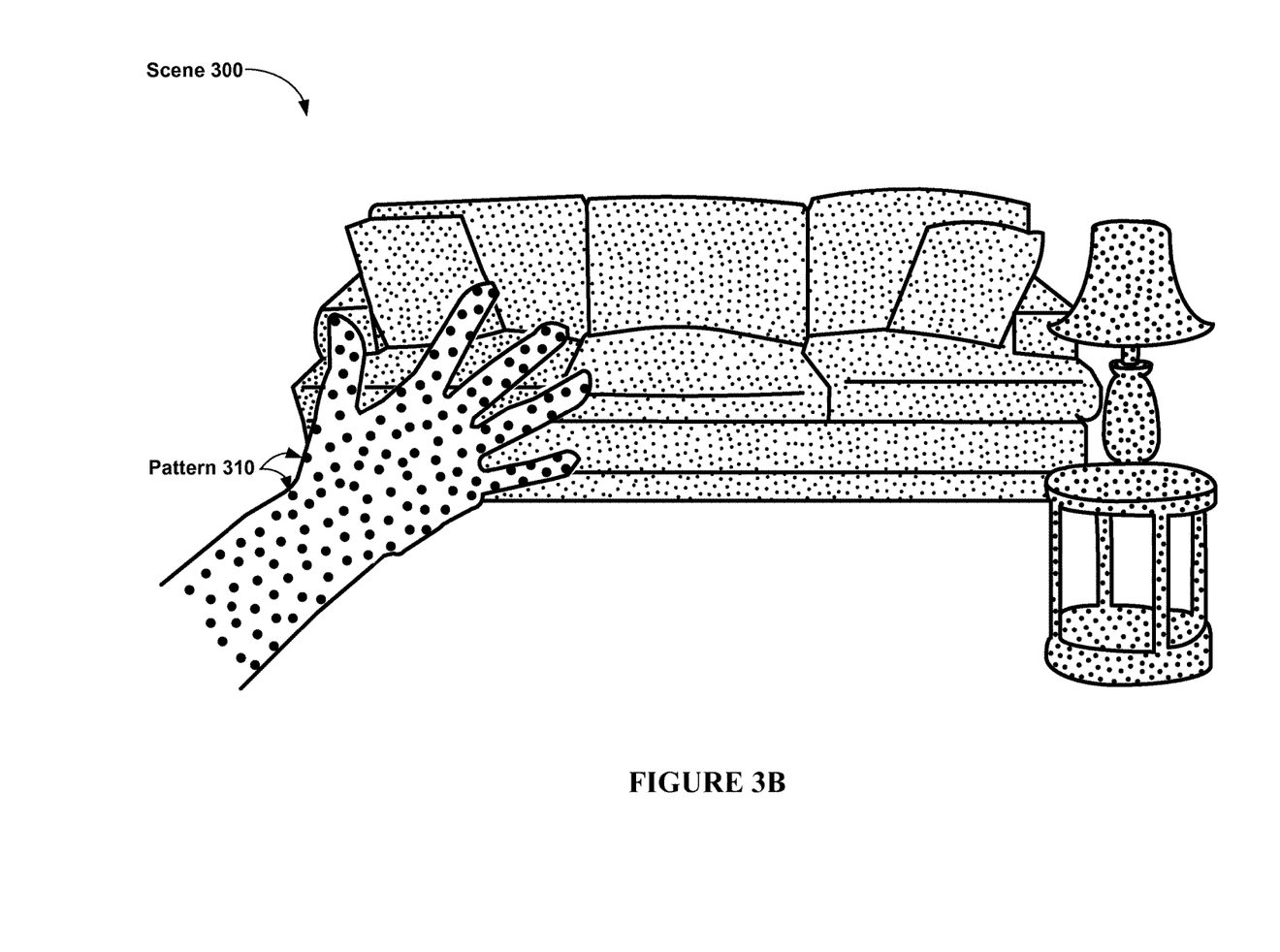

FIGS. 3A-3B illustrate exemplary procedures for projecting structured light on a scene, in accordance with some embodiments. FIG. 3A shows scene 300 including hand 302 at a first general distance, lamp 304 at a second general distance (further than the first general distance), and couch 306 at a third general distance (further than the second general distance). (These distances are referred to as general because each of these objects is three-dimensional and thus has some variation in its depth.) FIG. 3B shows scene 300 including projected structured-light pattern 310, a dot pattern. FIG. 3B further shows the dots from pattern 310 larger and denser at closer distances. Pattern 310 is projected by a projector (e.g., projector 104, FIG. 1). In some embodiments, the structured-light patterns applied to a scene include dot patterns, line patterns, grid patterns, and/or other patterns incorporating structured light of various shapes.

Figure 4A:
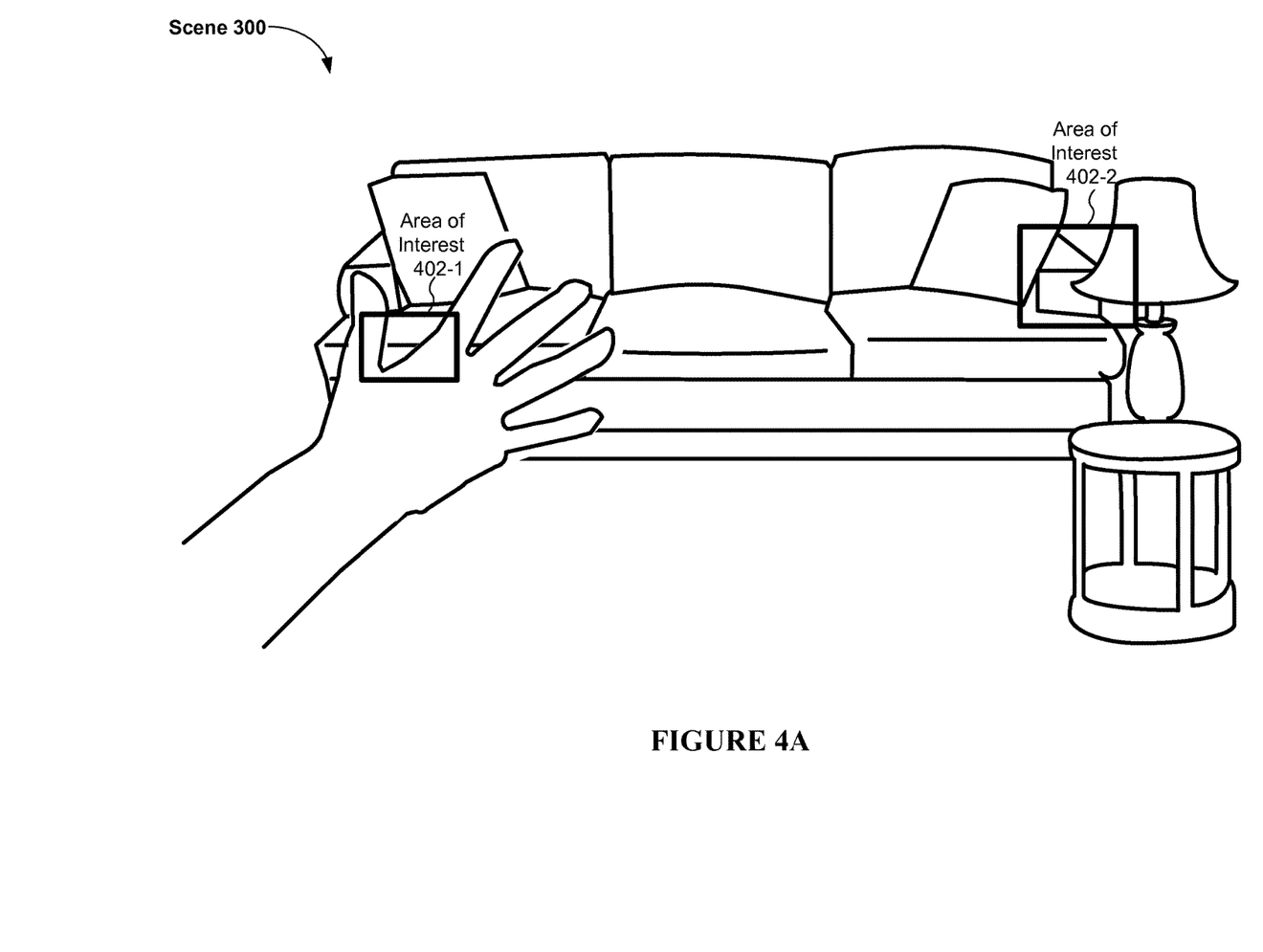
FIGS. 4A-4D illustrate exemplary procedures for projecting structured light on areas of interest in a scene, in accordance with some embodiments.
Figure 4B:
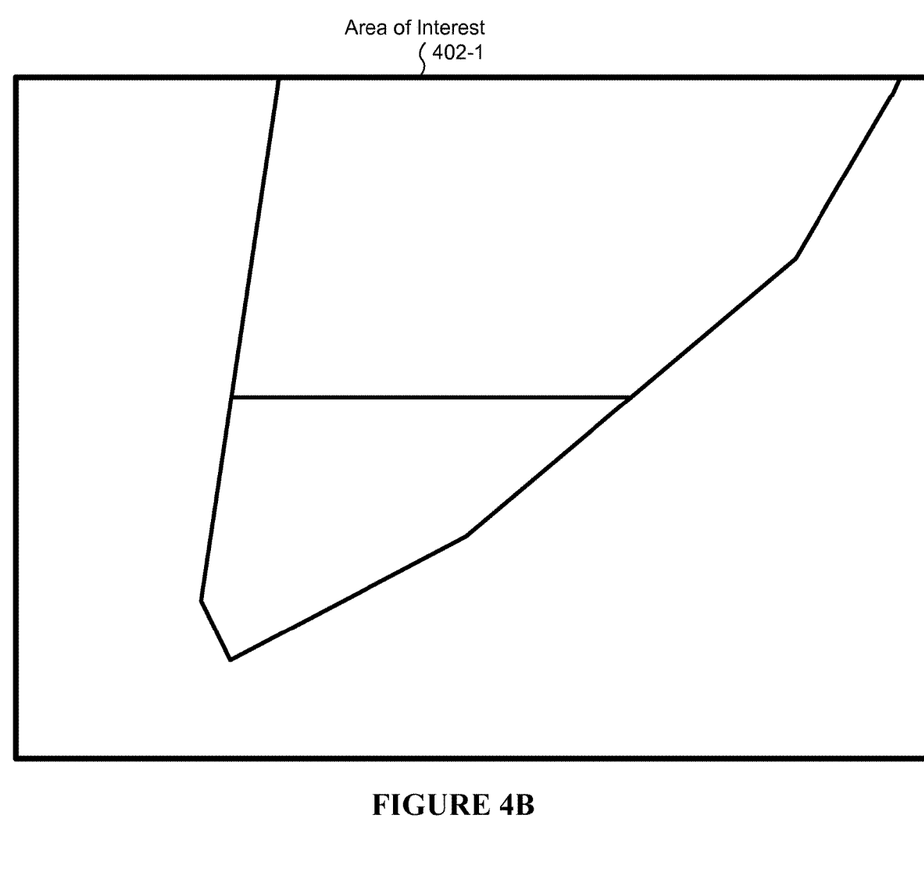
Figure 4C:
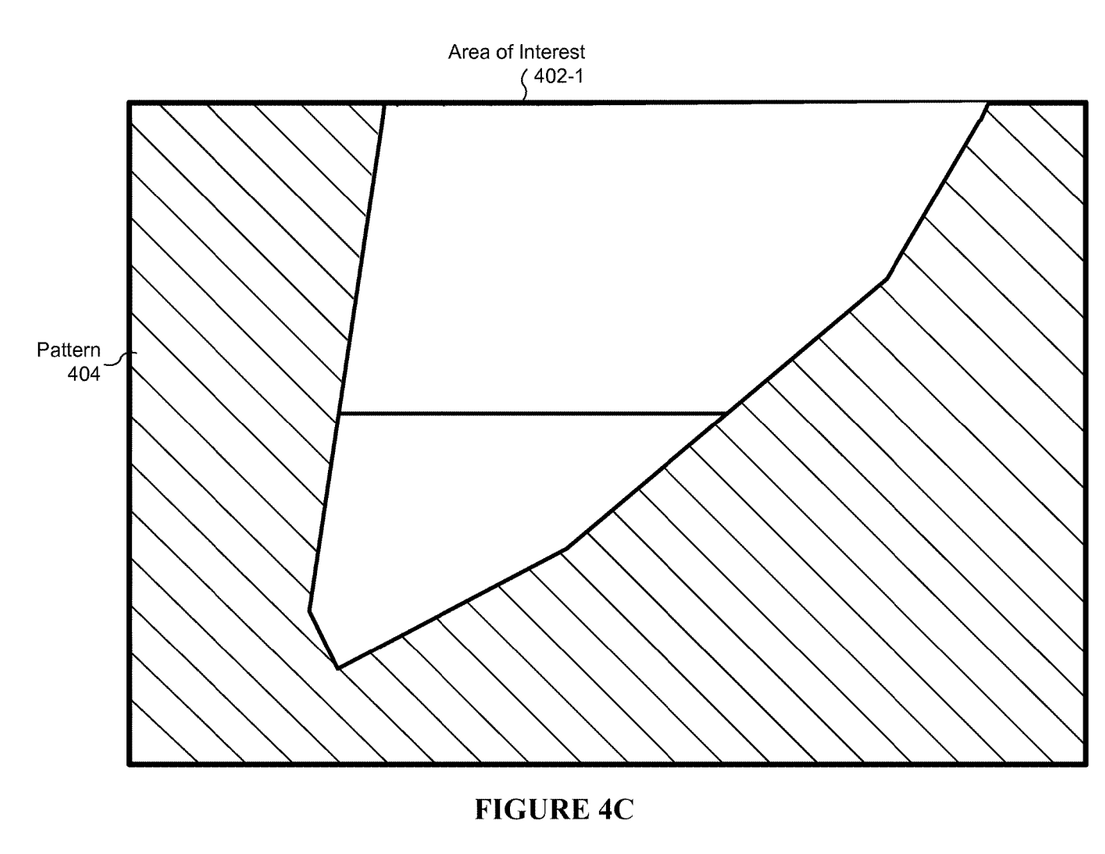
Figure 4D:
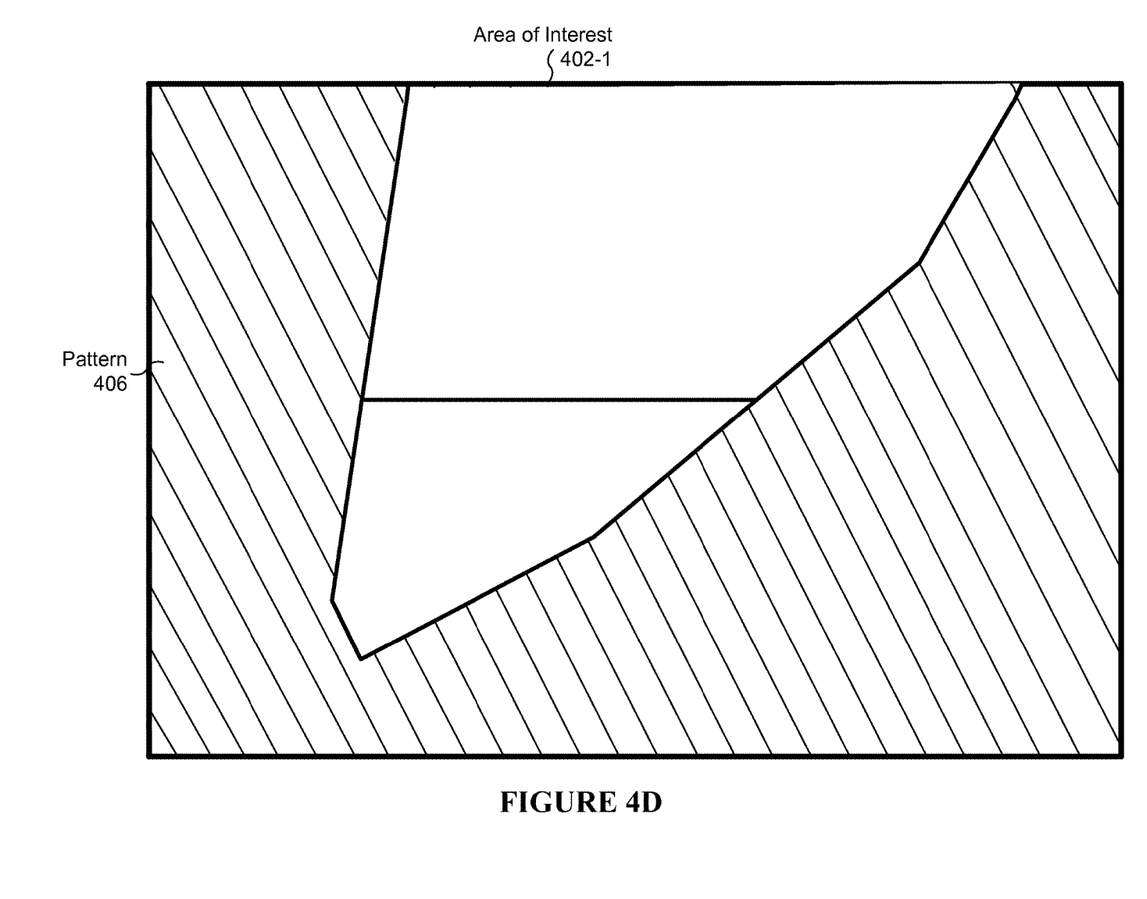

FIGS. 4A-4D illustrate exemplary procedures for projecting structured light on areas of interest in scene 300, in accordance with some embodiments. FIG. 4A shows scene 300 with identified areas of interest 402 (e.g., area of interest 402-1 and 402-2). FIGS. 4B-4D show an enlarged view of area of interest 402-1. FIG. 4B shows area of interest 402-1 without a structured-light pattern projected on it. FIG. 4C shows area of interest 402-1 with projected structured-light pattern 404, a line pattern with parallel lines. FIG. 4C also shows the lines of pattern 404 effectively disappear in the far field, the far field being the part of couch 306 behind hand 302 in this instance. The lines of pattern 404 effectively disappear in the far field due to different spatial frequencies for the projected lines of pattern 404 on each respective object (e.g., hand 302 and couch 306). The lines have different spatial frequencies due to the differences in distance between each respective object. FIG. 4D shows area of interest 402-1 with projected structured-light pattern 406, a second line pattern. Pattern 406 is a line pattern rotated with respect to pattern 404 (i.e., the lines of pattern 406 are rotated with respect to the lines of pattern 404). FIG. 4D also shows the lines of pattern 406 effectively disappear in the far field. In some embodiments, an apparatus calculates the depths of features within an area of interest based on the distortion in the projected pattern (e.g., the gradation and/or curve in the projected lines or the angle between portions of a respective line at an edge). In accordance with some embodiments, an apparatus dynamically generates patterns of structured-light based on the features of objects within a particular area of interest (e.g., generates line patterns in which respective lines intersect an object's edge at a specified angle).

Figure 5A:
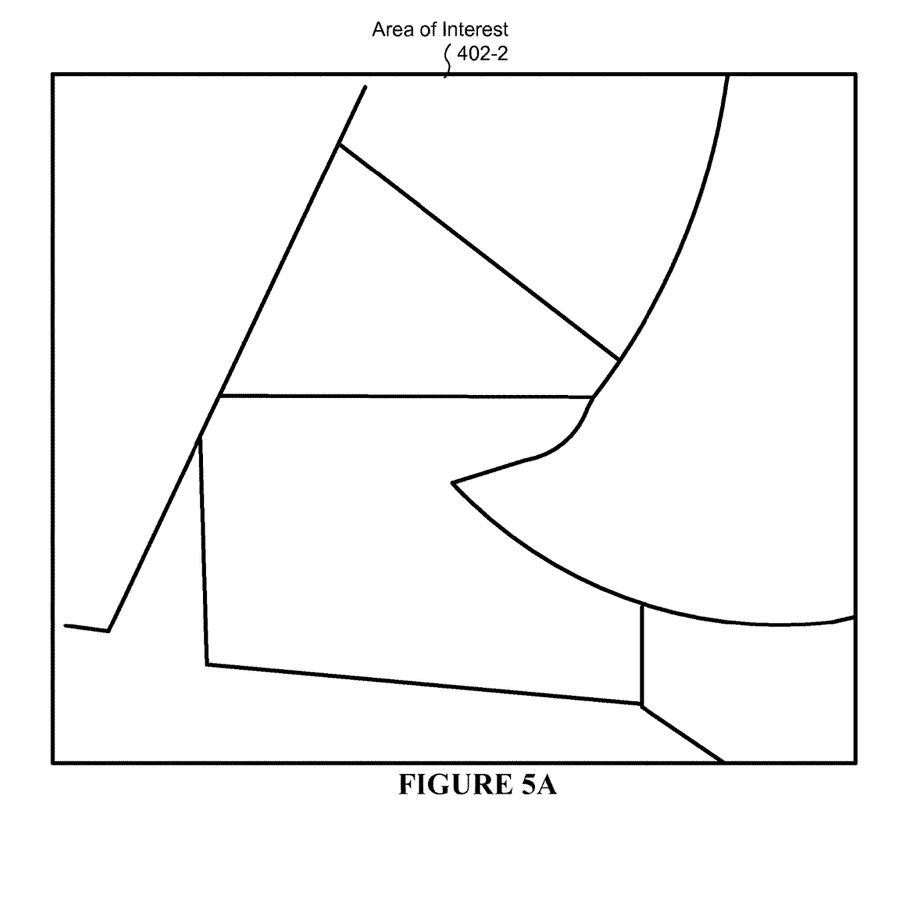
FIGS. 5A-5B illustrate additional exemplary procedures for projecting structured light on an area of interest in a scene, in accordance with some embodiments.
Figure 5B:
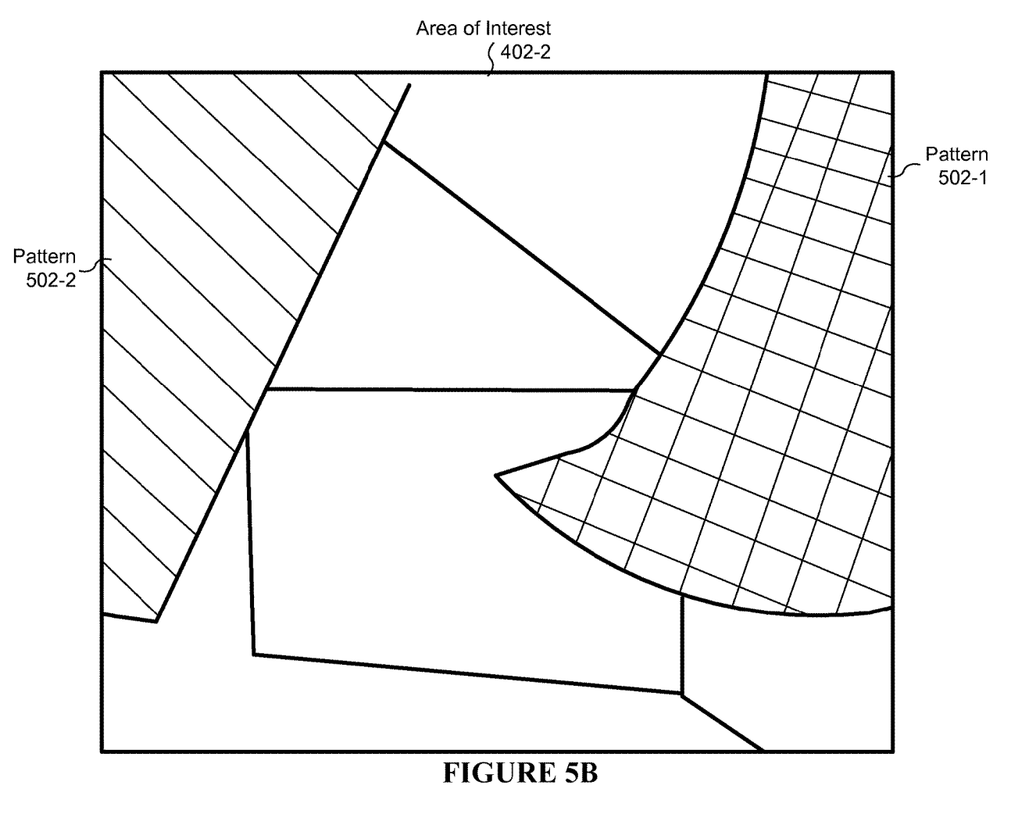

FIGS. 5A-5B illustrate additional exemplary procedures for projecting structured light on area of interest 402-2 in scene 300, in accordance with some embodiments. FIGS. 5A-5B show an enlarged view of area of interest 402-2. FIG. 5B shows area of interest 402-2 with projected structured-light patterns 502. Pattern 502-1 is a line pattern with parallel lines. Pattern 502-2 is a grid pattern, which may be considered a type of line pattern with parallel and perpendicular lines arranged in a grid. Pattern 502-1 is projected along the edges of lamp 304 and pattern 502-2 is projected along the edges of a pillow on couch 306. In accordance with some embodiments, pattern 502-1 and pattern 502-2 are parts of a single pattern. Thus, in accordance with some embodiments, a pattern includes lines that are generated to be perpendicular to multiple identified depth disrupting edges within the area of interest (e.g., lines at various orientations relative to one another).

Figure 6A:
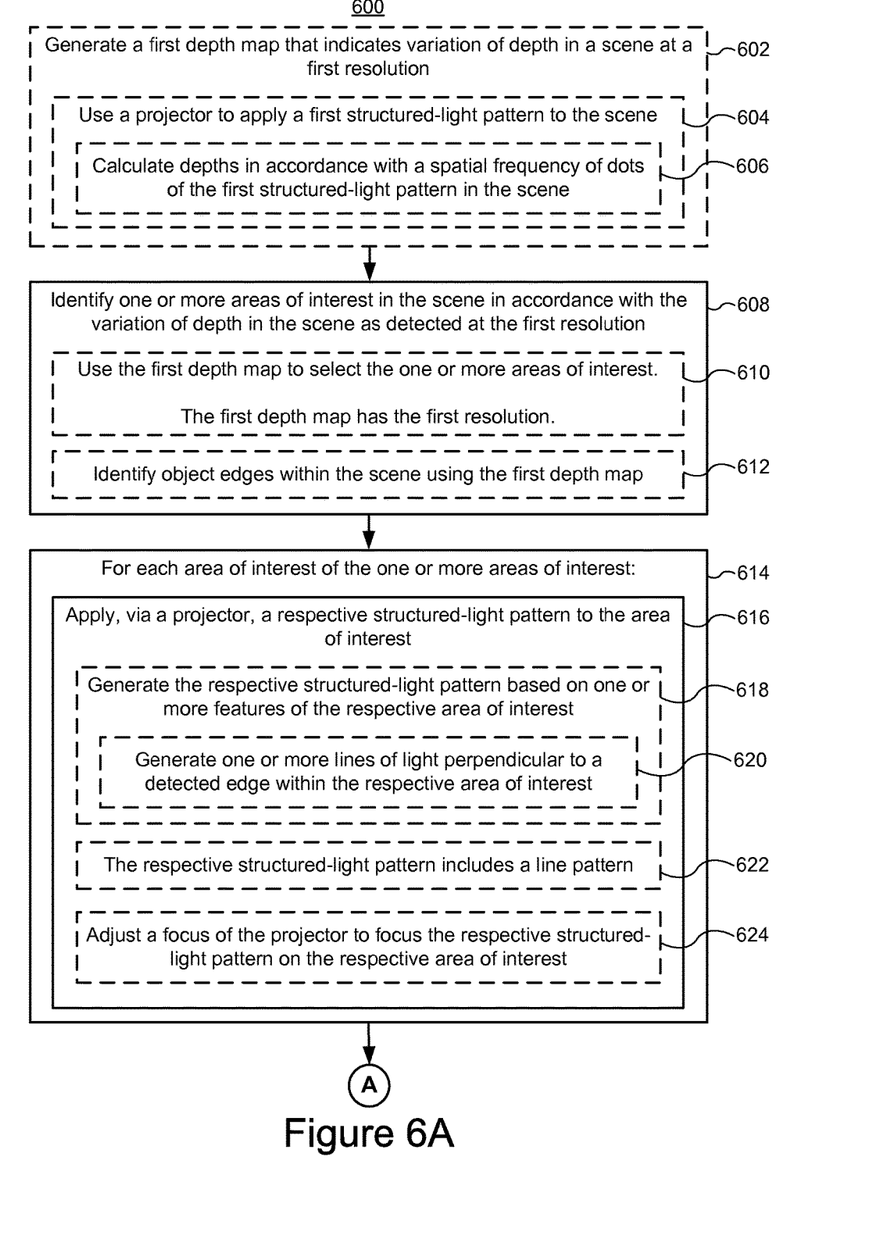
FIGS. 6A-6B are flow diagrams illustrating an exemplary method of depth mapping, in accordance with some embodiments.
Figure 6B:
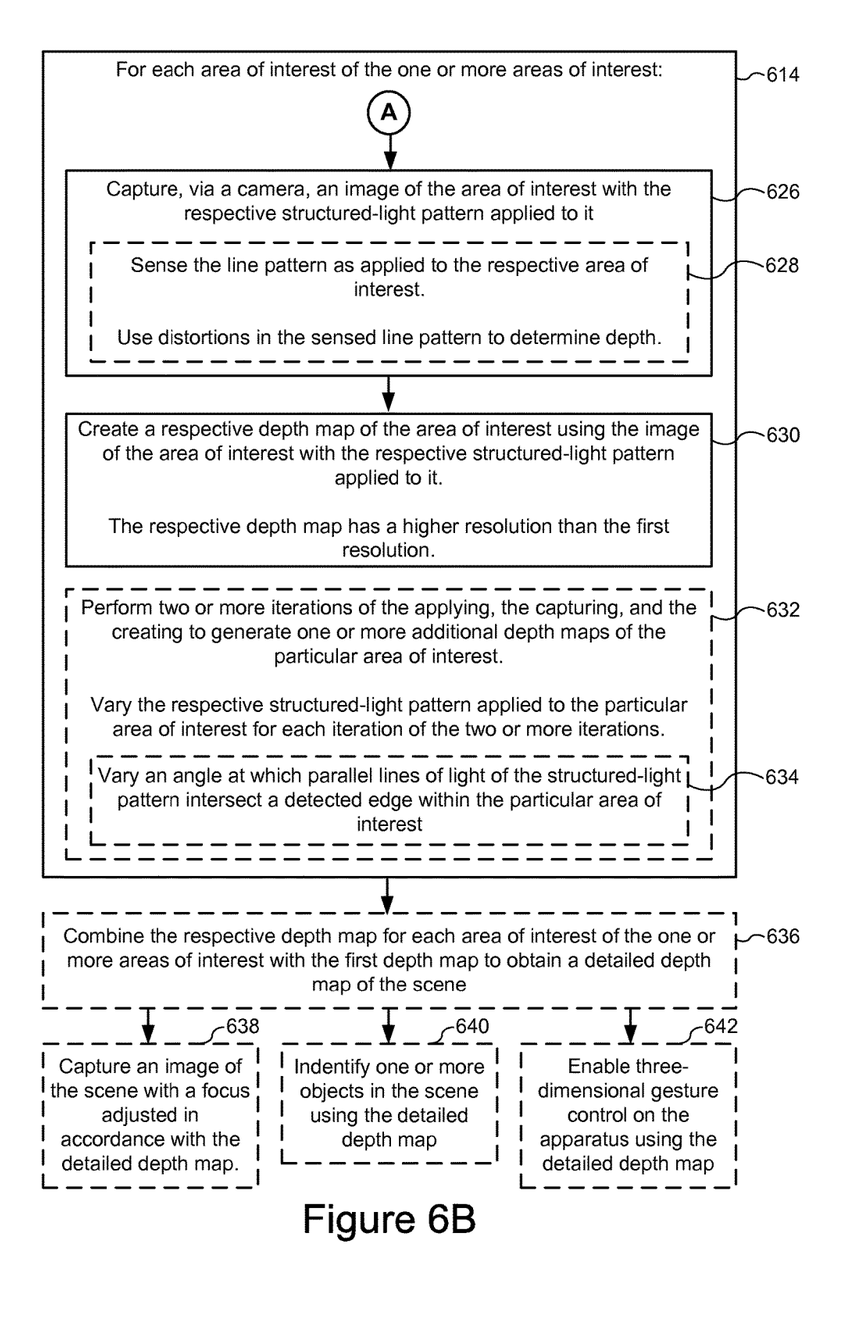

FIGS. 6A-6B are flow diagrams illustrating method 600 of depth mapping, in accordance with some embodiments. In some embodiments, method 600 is governed by instructions that are stored in a non-transitory computer-readable storage medium (e.g., in memory 206, FIG. 2) and that are executed by one or more processors of an apparatus (e.g., processor(s) 202 of device 100, FIG. 2). In some embodiments, method 600 is performed at an apparatus comprising a projector, a camera, one or more processors, and memory storing one or more programs for execution by one or more processors. As described below, method 600 provides a way to efficiently generate precise depth maps.

In some embodiments, the apparatus generates (602) a first depth map that indicates the variation of depth in a scene at a first resolution (e.g., using depth module 236, FIG. 2). In some embodiments, the first depth map is generated using a structured-light pattern. For example, the first depth map is generated using a dot pattern (e.g., pattern 310 as shown in FIG. 3B). In some embodiments, the structured-light pattern includes dots, lines, and/or other shapes of structured light.

In some embodiments, to generate the first depth map the apparatus uses (604) a projector (e.g., projector 104, FIG. 2) to apply a first structured-light pattern (e.g., pattern 310, FIG. 3B) to the scene. In some embodiments, the first structured-light pattern is distinct from structured-light patterns subsequently applied to particular areas of interest within the scene. For example, pattern 310 in FIG. 3B is distinct from pattern 404 in FIG. 4C and pattern 406 in FIG. 4D as well as patterns 502 in FIG. 5B. In some embodiments, the projector is a pico projector.

In some embodiments, the apparatus calculates (606) depths in accordance with a spatial frequency of dots of the first structured-light pattern in the scene (e.g., using depth mapping sub-module 242, FIG. 2). Thus, in some embodiments, the first structured-light pattern includes a dot pattern and generating the first depth map includes calculating depths in accordance with a spatial frequency of dots in the scene. For example, the apparatus calculates depths in accordance with the spatial frequency of dots in pattern 310 as shown in FIG. 3B.

In some embodiments, the first structured-light pattern includes a line pattern.

In some embodiments, the first depth map is obtained from an external source, distinct from the apparatus (e.g., obtained via communication interface(s) 204, FIG. 2). In some embodiments, the first depth map is generated using stereo cameras. For example, each camera generates a 2-D frame and the frames are combined to create a 3-D image using a known distance between the cameras and differences in object positions between the two frames. In some embodiments, the first depth map is generated using a time-of-flight sensor (e.g., a time-of-flight camera). For example, the device emits an outgoing beam then measures the phase shift of the beam at the sensor (receiver).

The apparatus identifies (608) one or more areas of interest in the scene in accordance with variation of depth in the scene as detected at the first resolution (e.g., using area of interest sub-module 241, FIG. 2). In some embodiments, areas of interest in the scene are identified in accordance with identification of depth disrupting edges. For example, FIG. 4A shows areas of interest 402 identified in scene 300 using their depth disrupting edges. Area of interest 402-1 includes depth disrupting edges between hand 302 and couch 306 and area of interest 402-2 includes depth disrupting edges between lamp 304 and cough 306. In some embodiments, the one or more areas of interest in the scene are identified in accordance with a focus of the apparatus (e.g., a focus of a camera on the apparatus). In some instances, the focus is auto-set and, in other instances, the focus set by a user of the apparatus.

In some embodiments, the apparatus uses (610) the first depth map to select the one or more areas of interest (e.g., using area of interest sub-module 241, FIG. 2) and the first depth map has the first resolution. For example, the apparatus identifies (612) edges within the scene using the first depth map (e.g., using edge detection sub-module 240, FIG. 2) and identifies the one or more areas of interest accordingly. Areas of interest 402 in FIG. 4A may be identified using a depth map generated by capturing an image of scene 300 illuminated with projected pattern 310 in FIG. 3B. In some embodiments, the one or more areas of interest include the entire scene.

For each area of interest (614), the apparatus applies (616), via a projector (e.g., projector 104, FIG. 2), a respective structured-light pattern to the area of interest (e.g., using projection module 230, FIG. 2). For example, FIG. 4A shows areas of interest 402, FIG. 4C shows structured-light pattern 404 applied to area of interest 402-1, and FIG. 5B shows structured-light patterns 502-1 and 502-2 applied to area of interest 402-2.

In some embodiments, to apply a structured-light pattern to a respective area of interest, the apparatus generates (618) the respective structured-light pattern based on one or more features of the respective area of interest (e.g., using pattern module 232, FIG. 2). FIG. 5B shows projected patterns 502 generated such that lines within each pattern are projected across depth disrupting edges (e.g., the edges of lamp 304) with a specified orientation (e.g., such that at least some lines intersect an object's edge from one side at a specified angle).

For example, the apparatus generates (620) one or more lines of light perpendicular to a detected edge within the respective area of interest (e.g., using pattern module 232, FIG. 2). Thus, in some embodiments, generating the respective structured-light pattern based on the one or more features of the respective area of interest includes generating one or more lines of light perpendicular to a detected edge within the respective area of interest. FIG. 5B shows projected patterns 502 generated such that lines within each pattern are perpendicular to the detected edges (e.g., the edges of lamp 304).

In some embodiments, the respective structured-light pattern includes (622) a line pattern. For example, patterns 502 in FIG. 5B include line patterns. In some embodiments, the respective line pattern includes a grid of perpendicular lines. For example, pattern 502-1 in FIG. 5B includes a grid of perpendicular lines. In some embodiments, the respective structured-light pattern includes dots, lines, and/or other shapes of structured light.

In some embodiments, the apparatus adjusts (624) a focus of the projector to focus the respective structured-light pattern on the respective area of interest (e.g., using projection module 230 and/or focus module 238, FIG. 2). For example, projector 104 shown in FIG. 1 focuses on area of interest 402-2 as shown in FIG. 5B, such that patterns 502 are primarily applied within the area of interest. In some embodiments, the apparatus adjusts a focus of a camera (e.g., camera 102, FIG. 2) to focus on the respective area of interest.

For each area of interest (614, FIG. 6B), the apparatus captures (626), via a camera (e.g., camera 102, FIG. 2), an image of the area of interest with the respective structured-light pattern applied to it (e.g., using imaging module 234, FIG. 2). For example, the camera captures area of interest 402-2 with patterns 502 applied as shown in FIG. 5B. In some embodiments, the projector projects the structured-light pattern at a wavelength not generally visible to the human eye (e.g., infrared wavelengths) and the camera is configured to capture the projected structured-light patterns at the given wavelength(s). For example, the camera is an infrared camera and the projector uses infrared lasers or LEDs.

In some embodiments, the apparatus senses (628) the line pattern as applied to the respective area of interest (e.g., using imaging module 234, FIG. 2) and uses distortions in the sensed line pattern to determine depth (e.g., using depth module 236, FIG. 2). Thus, in some embodiments, capturing (626) the image includes sensing the line pattern as applied to the respective area of interest; and creating (630, below) the respective depth map for the respective area of interest includes using distortions in the sensed line pattern to determine depth. For example, device 100 senses pattern 404 applied to area of interest 402-1 as shown in FIG. 4C and uses the distortions of lines within sensed pattern 404 to determine depth.

For each area of interest (614), the apparatus creates (630) a respective depth map of the area of interest using the image of the area of interest with the respective structured-light pattern applied to it (e.g., using depth module 2326 FIG. 2). The respective depth map has a higher resolution than the first resolution. For example, device 100 generates a respective depth map for area of interest 402-1 using an image of area of interest 402-1 with pattern 404 applied, as shown in FIG. 4C, and/or generates a respective depth map for area of interest 402-2 using an image of area of interest 402-2 with patterns 502-1 and 502-2 applied, as shown in FIG. 5B. In some embodiments, the respective depth map for each area of interest has a higher resolution than the first depth map.

In some embodiments, the apparatus performs (632) two or more iterations of the applying (616), the capturing (626), and the creating (630) to generate one or more additional depth maps of a particular area of interest (or of each area of interest or a subset thereof). In addition, the apparatus varies the respective structured-light pattern applied to the particular area of interest for each iteration of the two or more iterations (e.g., using pattern module 232 and/or projection module 230, FIG. 2). In some embodiments, the apparatus compares and/or combines the additional depth maps to generate a more precise depth map for the particular area of interest. In some embodiments, the apparatus: (1) applies multiple structured-light patterns to a particular area, (2) obtains multiple depth maps, and (3) compares and/or combines the depth maps to increase the depth precision for the particular area. In some embodiments, a particular structured-light pattern is adjusted (e.g., rotated 5-10 degrees) for each iteration. For example, FIG. 4C shows area of interest 402-1 with pattern 404 applied and FIG. 4D shows area of interest 402-2 with pattern 406 applied. Pattern 406 is generated by rotating pattern 404. In some embodiments, the iterations are continued until particular projected lines within the structured-light pattern are determined to be perpendicular to respective depth disrupting edges within the area of interest.

In some embodiments, the apparatus adjusts the structured light pattern by varying (634) an angle at which parallel lines of light of the structured-light pattern intersect a detected edge within the particular area of interest (e.g., using pattern module 232, FIG. 2), such that the angle is distinct in each iteration. For example, FIG. 4C shows area of interest 402-1 with pattern 404 applied such that the lines of pattern 404 intersect the edges of hand 302 at a first angle; and FIG. 4D shows area of interest 402-2 with pattern 406 applied such that the lines of pattern 406 intersect the edges of hand 302 a second angle, distinct from the first angle.

In some embodiments, the apparatus combines (636) the respective depth map for each area of interest of the one or more areas of interest with the first depth map to obtain a detailed depth map of the scene (e.g., using depth module 236, FIG. 2). In some embodiments, at least a portion of the detailed depth has a higher resolution than the first depth map (e.g., is more precise), since each respective depth map has a higher resolution than the first depth map. In some embodiments, the apparatus combines the respective depth map for each of at least a subset of the one or more areas of interest with the first depth map to obtain a detailed depth map of the scene. In some embodiments, the apparatus sends the respective depth maps to an external device (e.g., via communication interface(s) 204, FIG. 2) and receives the detailed depth map from the external device (e.g., via communication interface(s) 204).

In some embodiments, the apparatus captures (638) an image of the scene (e.g., using imaging module 234 in conjunction with camera 102, FIG. 2) with a focus adjusted in accordance with the detailed depth map (e.g., adjusted using focus module 238, FIG. 2). Alternatively, the focus is adjusted in accordance with a respective depth map for an area of interest. Thus, in some embodiments, the apparatus adjusts a focus of the camera in accordance with the detailed depth map; and captures an image of the scene with the adjusted focus.

In some embodiments, the apparatus identifies (640) one or more objects in the scene (e.g., using object recognition module 244, FIG. 2) using the detailed depth map. For example, device 100 identifies hand 302, lamp 304, and/or couch 306 in scene 300 as shown in FIG. 3A.

In some embodiments, the apparatus enables (642) three-dimensional (3-D) gesture control (e.g., using 3-D module 246, FIG. 2) on the apparatus using the detailed depth map. In some embodiments, the apparatus uses the detailed depth map to improve 3-D gesture control. For example, the apparatus uses the detailed depth map to enable more accurate gesture recognition than otherwise available.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, performed at an apparatus having a projector, a camera, one or more processors, and memory storing one or more programs for execution by the one or more processors, the method comprising:

identifying one or more areas of interest in a scene in accordance with variation of depth in the scene as detected at a first resolution; and for each area of interest of the one or more areas of interest:

applying, via the projector, a respective structured-light pattern to the area of interest;

capturing, via the camera, an image of the area of interest with the respective structured-light pattern applied to it; and creating a respective depth map of the area of interest using the image of the area of interest with the respective structured-light pattern applied to it, the respective depth map having a higher resolution than the first resolution;

for a particular area of interest of the one or more areas of interest:

performing two or more iterations of the applying, the capturing, and the creating to generate one or more additional depth maps of the particular area of interest; and varying the respective structured light-pattern applied to the particular area of interest for each iteration of the two or more iterations.

2. The method of claim 1, further comprising generating a first depth map at the apparatus that indicates the variation of depth in the scene at the first resolution;

wherein identifying the one or more areas of interest in the scene comprises identifying object edges within the scene using the first depth map.

3. The method of claim 2, wherein generating the first depth map comprises using the projector to apply a first structured-light pattern to the scene.

4. The method of claim 3, wherein:

the first structured-light pattern comprises a dot pattern; and generating the first depth map further comprises calculating depths in accordance with a spatial frequency of dots in the scene.

5. The method of claim 1, wherein, for a respective area of interest, applying the respective structured-light pattern comprises generating the respective structured-light pattern based on one or more features of the respective area of interest.

6. The method of claim 5, wherein generating the respective structured-light pattern based on the one or more features of the respective area of interest comprises generating one or more lines of light perpendicular to a detected edge within the respective area of interest.

7. The method of claim 1, wherein, for a respective area of interest, the respective structured-light pattern comprises a line pattern.

8. The method of claim 7, wherein:

capturing the image comprises sensing the line pattern as applied to the respective area of interest; and creating the respective depth map for the respective area of interest comprises using distortions in the sensed line pattern to determine depth.

9. The method of claim 1, wherein the projector is an infrared pico-projector.

10. The method of claim 1, wherein, for a respective area of interest, applying the respective structured-light pattern comprises adjusting a focus of the projector to focus the respective structured-light pattern on the respective area of interest.

11. The method of claim 1, wherein:

identifying the one or more areas of interest in the scene comprises using a first depth map to select the one or more areas of interest, the first depth map having the first resolution; and the method further comprises combining the respective depth map for each area of interest of the one or more areas of interest with the first depth map to obtain a detailed depth map of the scene.

12. The method of claim 11, further comprising:

adjusting a focus of the camera in accordance with the detailed depth map; and capturing an image of the scene with the focus adjusted in accordance with the detailed depth map.

13. The method of claim 11, further comprising identifying one or more objects in the scene using the detailed depth map.

14. The method of claim 11, further comprising enabling three-dimensional gesture control on the apparatus using the detailed depth map.

15. The method of claim 1, wherein:

the respective structured-light pattern for the particular area of interest comprises parallel lines of light; and varying the respective structured-light pattern comprises varying an angle at which the parallel lines of light intersect a detected edge within the particular area of interest.

16. An apparatus, comprising:

a projector;

a camera;

one or more processors; and memory storing one or more programs configured to be executed by the one or more processors, the one or more programs comprising instructions for:

identifying one or more areas of interest in a scene in accordance with variation of depth in the scene as detected at a first resolution; and for each area of interest of the one or more areas of interest:

applying, via the projector, a respective structured-light pattern to the area of interest;

capturing, via the camera, an image of the area of interest with the respective structured-light pattern applied to it; and creating a respective depth map of the area of interest using the image of the area of interest with the respective structured-light pattern applied to it, the respective depth map having a higher resolution than the first resolution;

for a particular area of interest of the one or more areas of interest:

performing two or more iterations of the applying, the capturing, and the creating to generate one or more additional depth maps of the particular area of interest; and varying the respective structured light-pattern applied to the particular area of interest for each iteration of the two or more iterations.

17. The apparatus of claim 16, wherein, for a respective area of interest, applying the respective structured-light pattern comprises generating the respective structured-light pattern based on one or more features of the respective area of interest.

18. A non-transitory computer-readable storage medium storing one or more programs for execution by one or more processors in an apparatus that further comprises a projector and a camera, the one or more programs comprising instructions for:

identifying one or more areas of interest in a scene in accordance with variation of depth in the scene as detected at a first resolution; and for each area of interest of the one or more areas of interest:

applying, via the projector, a respective structured-light pattern to the area of interest;

capturing, via the camera, an image of the area of interest with the respective structured-light pattern applied to it; and creating a respective depth map of the area of interest using the image of the area of interest with the respective structured-light pattern applied to it, the respective depth map having a higher resolution than the first resolution;

for a particular area of interest of the one or more areas of interest:
  performing two or more iterations of the applying, the capturing, and the creating to generate one or more additional depth maps of the particular area of interest; and
  varying the respective structured light-pattern applied to the particular area of interest for each iteration of the two or more iterations.

19. The storage medium of claim 18, wherein, for a respective area of interest, applying the respective structured-light pattern comprises generating the respective structured-light pattern based on one or more features of the respective area of interest.

* * * * *